United States Patent [19]
Baecker et al.

[11] Patent Number: 5,479,602
[45] Date of Patent: Dec. 26, 1995

[54] CONTENT-BASED DEPICTIONS OF COMPUTER ICONS

[75] Inventors: Ronald M. Baecker; Ian S. Small, both of Toronto, Canada

[73] Assignee: Apple Computer, Inc., Cupertino, Calif.

[21] Appl. No.: 76,265

[22] Filed: Jun. 11, 1993

Related U.S. Application Data

[63] Continuation of Ser. No. 486,041, Feb. 27, 1990, abandoned.

[51] Int. Cl.$^6$ ........................................................ G06T 3/00
[52] U.S. Cl. .......................... 395/159; 395/155; 395/139
[58] Field of Search ..................................... 395/155–161, 395/128, 139, 145–148, 127–131, 141

[56] References Cited

U.S. PATENT DOCUMENTS

| | | | |
|---|---|---|---|
| 4,649,380 | 3/1987 | Penna | 340/750 |
| 4,723,211 | 2/1988 | Barker et al. | 395/159 X |
| 4,899,136 | 2/1990 | Beard et al. | 340/706 |
| 5,001,697 | 3/1991 | Torres | 395/139 |
| 5,021,976 | 6/1991 | Wexelblat et al. | 364/518 X |
| 5,040,131 | 8/1991 | Torres | 395/157 X |
| 5,129,057 | 7/1992 | Strope et al. | 395/161 |
| 5,249,263 | 9/1993 | Yanker | 395/159 X |
| 5,333,256 | 7/1994 | Green et al. | 395/159 |

OTHER PUBLICATIONS

Christopher F. Herot, Richard Carling, Mark Friedell, & David Kramlich, "Prototype Spatial Data Management System", Computer Graphics (ACM), vol. 14 No. 3 1980. SIGGRAPH '80 Conference. pp. 63–70.
Richard A. Bolt, "Human Interfaces For Managers", Computerwold vol. 18 No. 29 Jul. 16 1984. pp. ID/1–ID/18.
Richard A. Bolt, "Spatial Data–Management", Massachusetts Institute of Technology, 1979 Final Technical Report for Defense Advanced Research Projects Agency/Office of Cybernetics Technology, Contract No. MDA903–77–C–0037. pp. 1–60.
Research Disclosure, vol. 305, Disclosure No. 30535, Kenneth Mason Publications Limited, Hampshire (Sep., 1989).

*Primary Examiner*—Almis R. Jankus
*Attorney, Agent, or Firm*—Blakely, Sokoloff, Taylor & Zafman

[57] ABSTRACT

A means and method for generating and displaying a contentbased depiction of a standard icon on the display of a computer is described. The depiction is generated upon the occurrence of predetermined events, such as the closure of the document or file associated with the icon, and is displayed in either a static or animated form in place of the standard icon in response to selection signals from a selection device. A single content-based depiction of an icon is generated by creating a representation of the object (file or document) to be depicted, and translating this representation into a scaled-down replica of the representation. This representation may be in the form of a bit-map, a full-scale image, etc. The replica is created by partitioning the representation into a number of equal segments, measuring the percentages of different colors (black and white, gray scale, or color) within each segment, and assigning a single color value to each display element or pixel of the replica based upon the color percentage measured from each corresponding segment of the representation. Animated depictions are created by forming a number of different replicas for each representation to be depicted and then displaying those replicas in a serial sequence to create an animated depiction of the representation. Like the icons these depictions replace when selected, the depictions would be movable to any position on the display through use of the mouse.

39 Claims, 6 Drawing Sheets

FIG. 7

Charles Evans Hughes, the governor of New York, who had spoken flatteringly to Holmes at a White House dinner two years before, was appointed to Brewer's place. Taft told Hughes-who was a potential rival for the presidency in 1912-that he meant to make him chief justice when Fuller retired.

The Court, reduced again to seven members while it waited for Hughes, adjourned early. Holmes wearily helped Fanny to pack for the summer in Beverly Farms.

The term has left me somewhat tired. Just think-it is the Eight-8th! that I have been here... years tick by like seconds to me. Last night I dreamed that I was to be executed-a sort of unpleasant premonition of the approach of finis. One begins to sum up-a vain attemp.

On the fourth of July, Melville Fuller died quietly at his house among the trees in Sorrento, Maine. His daughter Jane was alone in the house with him, and heard him call. "I am very ill," but when she came to his room he was dead. Holmes received a telegram that day, and the next night he spent on the train.

— 701

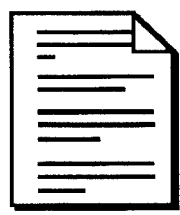

— 702

— 703

The services at Sorrento moved me through and through. It was touching enough to see the place where the chief had sat and tamed the squirrels so that they came and sat on his shoulder. And all the details of the ceremony were free from a single false note. The sun shone, the birds sang, the coffin was put on a buckboard and spread with a coverlet of flowers... the parson read the service extremely well, which is rare, the curch built by Richardson was charming, and a choir of four young villagers sang sweetly and movingly. "It was not death the avenger but death the friend." ... He died in the same place and with the same quiet as his wife a few years before. And so ends a great career... He loved me and I shall miss him as long as I sit on the Bench.

Holmes went with the family to Chicago, where the other justices joined him. There was a seventeen-gun salute over the lake, followed by grand solemnities and bombast at Graceland Cemetery. Then another long journey by train, finishing a wrenching week of travel, and Holmes was back in Beverly Farms. The Chief's death had stirred hardly a ripple in the life of the nation:

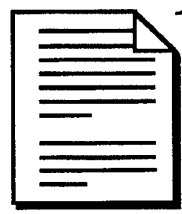

— 704

CONTENT-BASED DEPICTIONS OF COMPUTER ICONS

This is a continuation of application Ser. No. 07/486,041, filed Feb. 27, 1990 now abandoned.

BACKGROUND OF THE INVENTION

(1) Field of the Invention

This invention relates to the generation, display and manipulation of information on a computer display screen. Specifically, the field is that of the display and manipulation of depictions of icons on a display screen representing the variable contents of a document or application file or a folder of files.

(2) Prior Art

One significant feature of modern computer systems is the ability for a computer user to be able to easily access information and programs available for use on the computer system. One way that the access to information and programs has been facilitated is through the development of graphical user interfaces. Computer systems using a graphical user interface typically provide the capability to display icons on the computer display screen. Icons are small graphical images displayed on the screen that represent certain objects accessible to the computer user, such as files of information, documents, programs, or file folders. Icons can also represent certain actions which are being or could be performed by the computer, such as an icon representing a find command or a trashcan icon representing a delete command.

The use of icons to represent objects is particularly useful, since the operator can quickly identify a particular object simply by the shape and appearance of the icon. Icons can be manipulated in a number of different ways, although the most typical is through use of a cursor control device (i.e., mouse) and a selection button located on the mouse. By manipulating an icon, the computer user can access information, activate a program, or gain information about a document or program, such as the size of the document, the date of last modification, or the version number of the program. Icons are also useful in identifying programs or documents of a similar type. Due to their small size relative to the size of the display screen, many icons can be displayed at one time. Icons can also generally be moved to any location on the display screen, thereby maximizing the area available for the display of information. One well known system for displaying and manipulating icons is embodied in the Apple® Macintosh® computer system manufactured and distributed by Apple Computer, Inc., Cupertino, Calif.

Folders are collections of documents or programs represented by a single folder icon. Just as with document or program icons, the user can manipulate the folder icon to learn information about the folder, such as the size of the folder, or the date that the folder was last modified. Also, by manipulating a document or program icon, the user can move a document or program into a folder by selecting the document or program icon and moving the icon within the folder icon. In this way, the user can readily create collections of programs or documents within a folder. Similarly, one folder can be moved into another folder by selecting a first folder icon and moving the icon into a second folder icon. This feature allows the computer user to create a hierarchical collection of programs and documents within folders.

Icons are typically displayed in prior art graphical user interface systems as a static array of dots (pixels) on the display screen. This array of pixels, known as an icon image, is typically associated with the type of document or program represented by the icon. Other implementations associate an icon image with a document, depending upon the type of program used to manipulate the document. For example, documents created with certain word processing applications are represented by an icon image depicting a generic page of text or an image identifying the type of word processor used to create the document. In either case, the generic icon image is assigned at the time the program creates the document, and is not typically modified thereafter, thereby making it impossible for the icon image to represent changes in the content of the document. Similarly, folders are typically identified with an icon image depicting a small file folder. The folder icon conveys to the user the simple fact that the folder exists; but, it doesn't attempt to identify the content of a particular folder.

Although icons provide a quick way of conveying information to the user, they are limited by their small size. Since many icons may need to be displayed on the display screen simultaneously, the typical implementation for an icon image is limited to a square array of a small number of pixels. Graphical images of this size limit the type and scope of information that can be conveyed to the user. Moreover, the prior art method of using fixed icon images, depending upon the type of document or program, does not provide a way to distinguish between two documents or programs of the same type. Further, folder icons do not provide a mechanism for displaying the contents of a particular folder.

Some forms of icon animation have been used in the prior art to convey information to the user about an application or document. Icons are animated by changing the icon image over time to produce an illusion of image motion. Icon animation removes the limitation of using only a fixed array of pixels for an icon image while maintaining the size constraints of the icon as displayed on the display screen. Animation in the prior art is implemented by displaying a series of fixed frames. Each frame depicts the icon image at some instant in time. These fixed frames are produced by either manually creating a plurality of fixed icon images in various stages of motion or by digitizing a number of frames from an analog clip of video. This latter process produces icon-like, or small window-sized, images generally known as "dicons" (dynamic icons) or "micons" (movie icons). Either process is typically time-consuming and generally requires expensive additional equipment and/or software. Neither process is effective, nor suited, for depicting changes in the content of the object to be dynamically represented by the animated icon.

Some software applications allow the normally full-sized window in which the content of the document is being displayed to be reduced in size so that the user can simultaneously use other documents or carry out other tasks while the document is being displayed. Most of these applications do not actually shrink the text or images within the window as the window is being reduced. Hence, all the program really does is reduce the portion of the document that can be viewed and not recreate the document in a different form. Other software applications reduce the content of the entire document to fit within the new smaller display window, but such programs are only operative to carryout this technique when the program corresponding to the document in also running on the computer. Hence, to view the document is this reduced form, it would first be necessary to start the program and then take whatever additional steps that are necessary to cause the program to shrink the contents of the document.

To be useful, and certainly in the context of a desktop computer interface, icon animation images must have a close relationship to the object and the content of the objects that they represent, but be independent of their underlying programs. Hence, the process for generating the animation images must be as flexible and robust as possible, which are requirements not met by such prior art tools and methods.

SUMMARY OF THE INVENTION

The present invention provides a method and means for generating and displaying a content-based depiction of a standard icon on the display of a computer. The depiction is generated upon the occurrence of a predetermined event, such as the closure of the document or file associated with the icon. The depiction is displayed in either a static or animated form, in place of the standard icon, in response to selection signals from a selection device, such as a mouse. A single content-based depiction of an icon is generated by creating a representation of the object (file or document) to be depicted and then translating this representation into a scaled-down replica of the representation. This representation could take a number of different forms, such as a bit-map or even an actual full-scale image.

In the presently preferred embodiment of the present invention, the replica is created by partitioning the representation into a number of equal segments, measuring the percentage of different colors (black and white, gray scale, or color) within each segment, and assigning a single color value to each display element or pixel of the replica based upon the color percentage measured from each corresponding segment of the representation. For example, a replica pixel corresponding to a segment having 60% black coloration would be assigned a black color value. The remaining pixels would be assigned color values in a similar manner, so as to create an iconic depiction resembling the associated object. Naturally, the more segments a representation is broken into, the more accurate the replica of that representation.

More accurate replicas can also be created by forming a number of different replicas (frames) for each depiction and then displaying those frames in a serial sequence so as to create an animated depiction of the representation. For example, a multi-page document could have a replica formed for each page, or a drawing could have a replica formed for each quadrant of the drawing.

The predetermined events triggering generation of the replicas include: expiration of some predetermined time period; selection of the standard icon corresponding to the object by a mouse; or modification and storage of the object associated with the icon. Like the icons these depictions replace, the depictions can also be translated to any position on the display through use of a cursor control device, such as a mouse.

Many other features and details of the preferred embodiment of the present invention exist. The preferred embodiment is best understood when considered with the detailed description and the accompanying figures of the drawing provided below.

BRIEF DESCRIPTION OF THE DRAWINGS

FIG. 7 is an illustration of pages of text and the corresponding dynamically created icon frame.

DETAILED DESCRIPTION OF THE INVENTION

This invention relates to the generation, display and manipulation of depictions of computer icons that are derived from file or folder contents. The following detailed description describes a preferred embodiment of the present invention.

Figure 1:
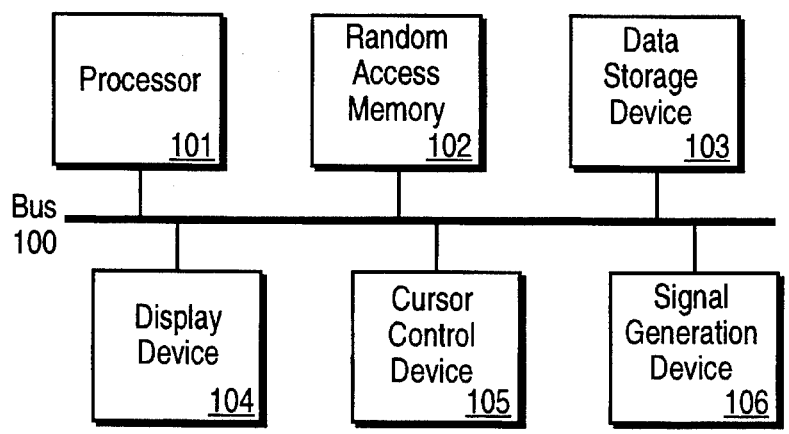
FIG. 1 is an illustration of the computer system architecture.

A preferred embodiment of the present invention is implemented on an Apple Macintosh computer system manufactured by Apple Computer, Inc., Cupertino, Calif. It is apparent to those of ordinary skill in the computer art, however, that alternative systems may be employed. In general, such systems, as illustrated by FIG. 1, comprise a bus 100 for communicating information, a processor 101 coupled with said bus 100 for processing information, a random access memory 102 coupled with said data storage device 103, such as magnetic disk and disk drive coupled with said bus 100 for storing information and instructions, a display device 104 coupled to said bus 100 for displaying information to the computer user, a cursor control device 105 coupled to said bus 100 for communicating information and command selections to said processor 101, and a signal generation device 106 coupled to said bus 100 for communicating command selections to said processor 101.

The display device 104 may contain a liquid crystal device, cathode ray tube, or other suitable display device and be operative to display bit-map or vector representations of information on its screen. The cursor control device 105 allows the computer user to dynamically signal the multi-dimensional movement of a visible symbol (cursor) on a display screen of said display device 104. Many implementations of the cursor control device are known in the art, including a trackball, mouse or joy-stick. The signal generation device 106 is typically a button located on the mouse or trackball but could also be a keyboard button, etc., depending on the software implementation of the program being utilized.

These devices and controls are used to select and manipulate the icon depictions of the present invention. The detailed operation and implementation of these devices, however, is described only where necessary to provide a thorough understanding of the present invention, since these methods are known to those of ordinary skill in the art.

The icon depictions of the present invention are small, graphical images displayed on a computer display screen. When activated, these icon depictions (depictions) replace the standard icon image (icon) used to represent objects resident in, or accessible to, the computer system. The objects represented by icons include documents, files, programs and folders. Information associated with each object is stored in random access memory 102 or in the data storage device 103, along with other icon information necessary for generating the icon associated with the object. If an object is moved, copied, or deleted, the icon information for the object is also moved, copied or deleted.

Icons can be displayed on both vector and bit-mapped displays. The manner for displaying icons on different types of display devices varies slightly in a manner which is well known in the relevant art. Accordingly, to simplify description of the present invention, the following disclosure will be limited to a discussion of bit-mapped displays.

The information used for the generation and display of an icon is comprised of an icon bitmap. The icon bitmap is a small portion of random access memory 102, or a portion of the data storage device 103 that is used to store a computer compatible representation of the icon. For 32-bit square icon depictions, each icon bitmap is a representation of a 32-bit wide by 32-bit high array corresponding to display elements (pixels) on the display screen. For black and white displays, a bit in the bitmap holding a value of 1 corresponds to a black dot in the corresponding display element on the display screen, while a bit in the bitmap holding a value of zero corresponds to a white dot in the corresponding display element. In this way, icons can be generated and displayed on the display screen as a 32 pixel by 32 pixel array of pixels in black or white. Equivalent embodiments may also display icons in multiple colors or multiple shades of gray.

Figure 2:
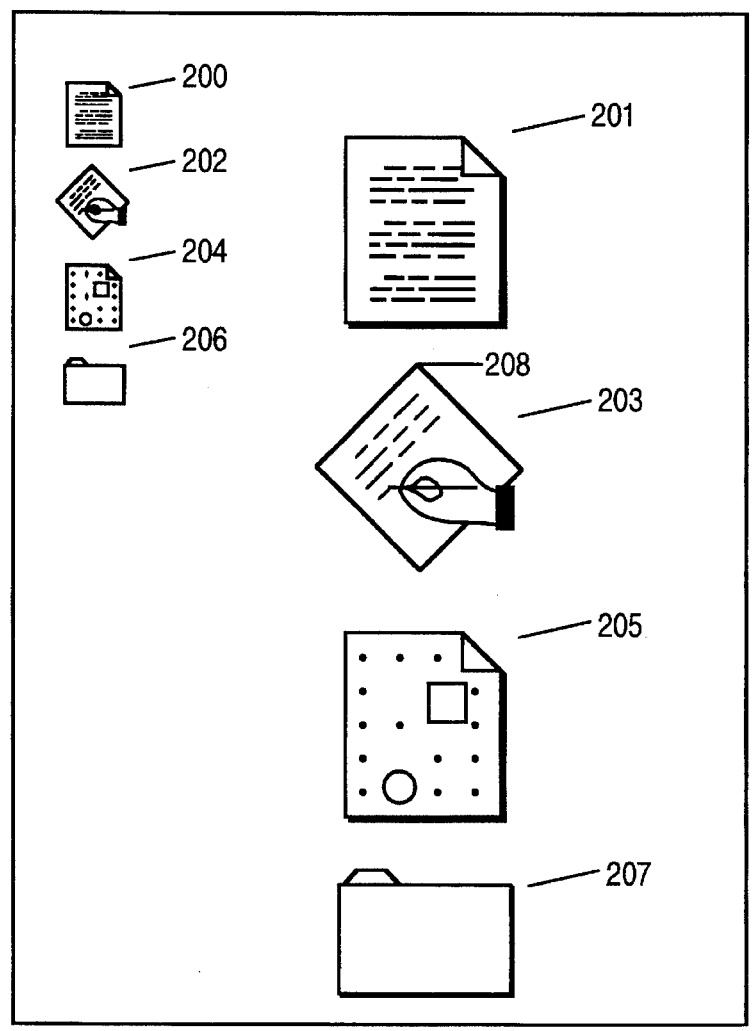
FIG. 2 is an illustration of icon image examples and the corresponding enlarged form.

FIG. 2 illustrates an example of four icons (200, 202, 204, and 206) and a corresponding enlarged version of each icon (201, 203, 205, and 207, respectively). These icons exist in only a static, nondynamic form in the prior art as implemented on the Apple Macintosh computer. The icon 200 and its corresponding enlarged version 201 is an example of an icon representing a text or word processing document. The icon 202 and its corresponding enlarged version 203 is an example of an icon representing a word processing program. The icon 204 and its corresponding enlarge version 205 is an icon representing a graphics document. The folder icon 206 and its enlarged version 207 is an icon representing a folder containing a plurality of other documents, programs, or other folders. As evident in the enlarged versions of each icon (201, 203, 205 and 207), each icon is made up of an array of a number of display elements (shown by small squares 208). By coloring some of the display elements black and others white, a graphic image can be created.

Figure 3:
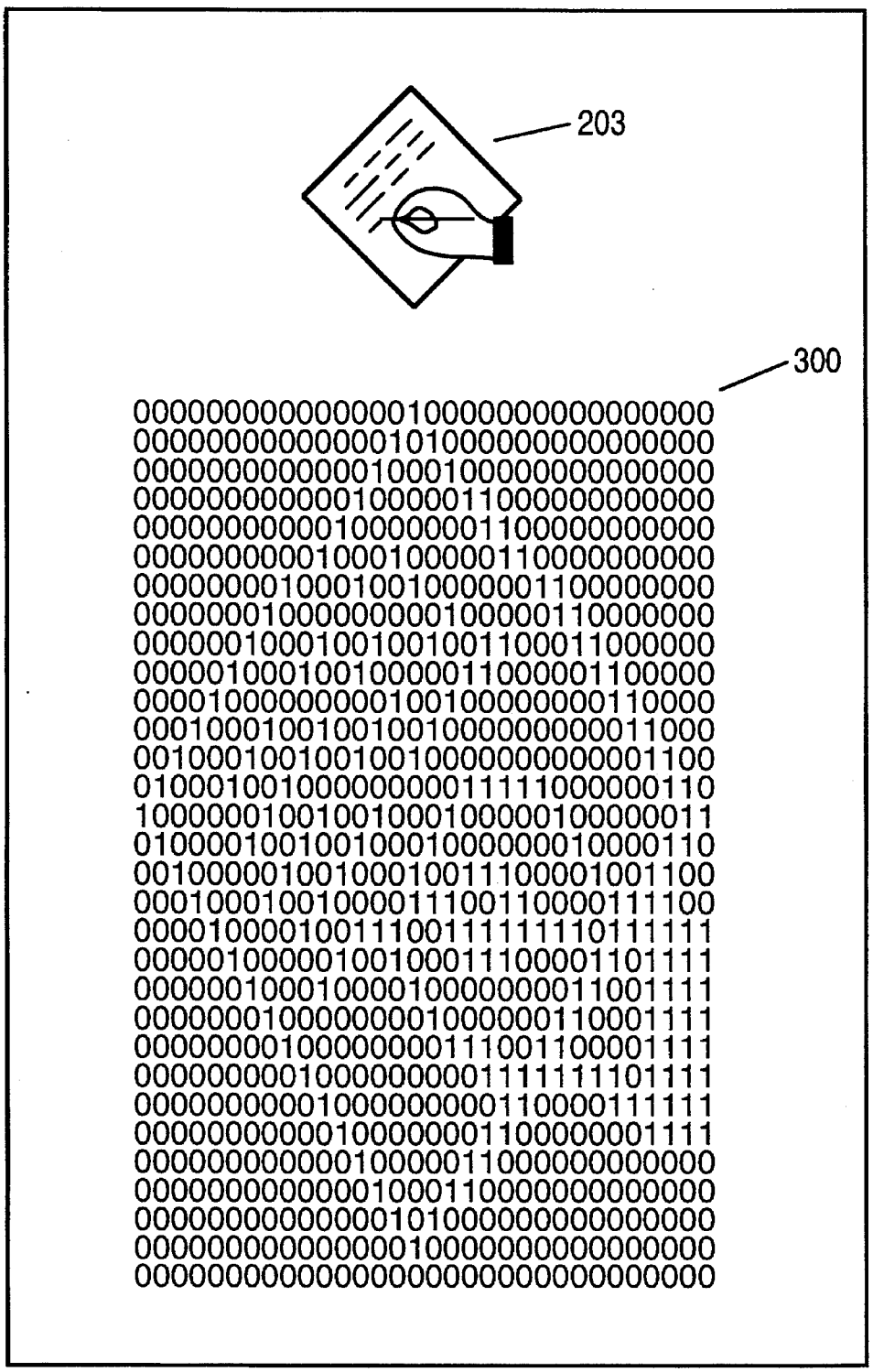
FIG. 3 is an illustration of an icon image and its corresponding icon bitmap.

The graphic image created for each icon is stored in random access memory 102 or on the data storage device 103 as an icon bitmap 300, as depicted in FIG. 3. In FIG. 3, the enlarged form of the word processing program icon 203 is shown in relation to its corresponding bitmap 300, as stored in memory 102 and manipulated by processor 101. Each bit in bitmap 300 that is set to a value of one corresponds to a black display element in icon 203. Similarly, bits in the bitmap 300 set to zero correspond to white display elements in the icon 203.

Figure 4:
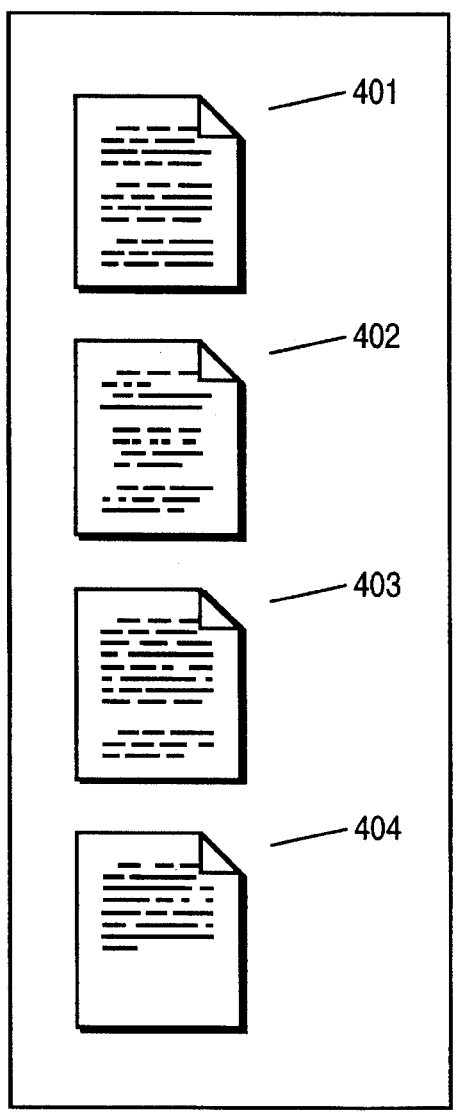
FIG. 4 is an illustration of the frames in an animation scenario for a text document.

The present invention improves the icon bitmap scheme described above by generating a content-based representation for each icon depiction of an object. Since each icon depiction is created in the same basic manner, application of the present invention can be illustrated by the animation scenario shown in FIG. 4. FIG. 4 depicts four static icon images (frames) corresponding to an animated text or word processing document icon depiction. In order to achieve the appearance of animation, the four frames 401, 402, 403 and 404 are sequentially displayed in the same location on the display screen for a short period of time. In a typical embodiment of the present invention, each frame is displayed for one-half second. As each frame is displayed in succession, the animated icon depiction has the appearance of sequentially paging through a text document. Similar results may be achieved by creating a set of frames wherein each line representing text is moved up one position. The animation scenario thus presents the illusion of a scrolling text document.

Figure 5:
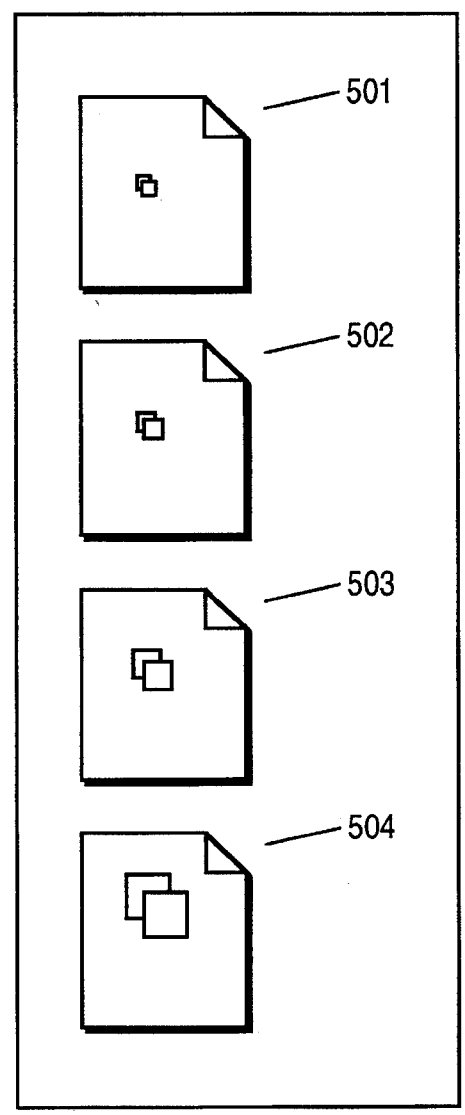
FIG. 5 is an illustration of the frames in an animation scenario for a graphic document.

Icon depiction animation is also possible by using multiple flames for representing a graphical or non-paginated document. FIG. 5 depicts an animation scenario representing the graphical form. In the example of FIG. 5, a graphical document, represented by the animated icon depiction scenario of frames 501–504, is shown as the image grows or zooms into the final icon frame 504. The user thus learns the graphic nature of the object represented by the animated icon depiction.

Figure 6:
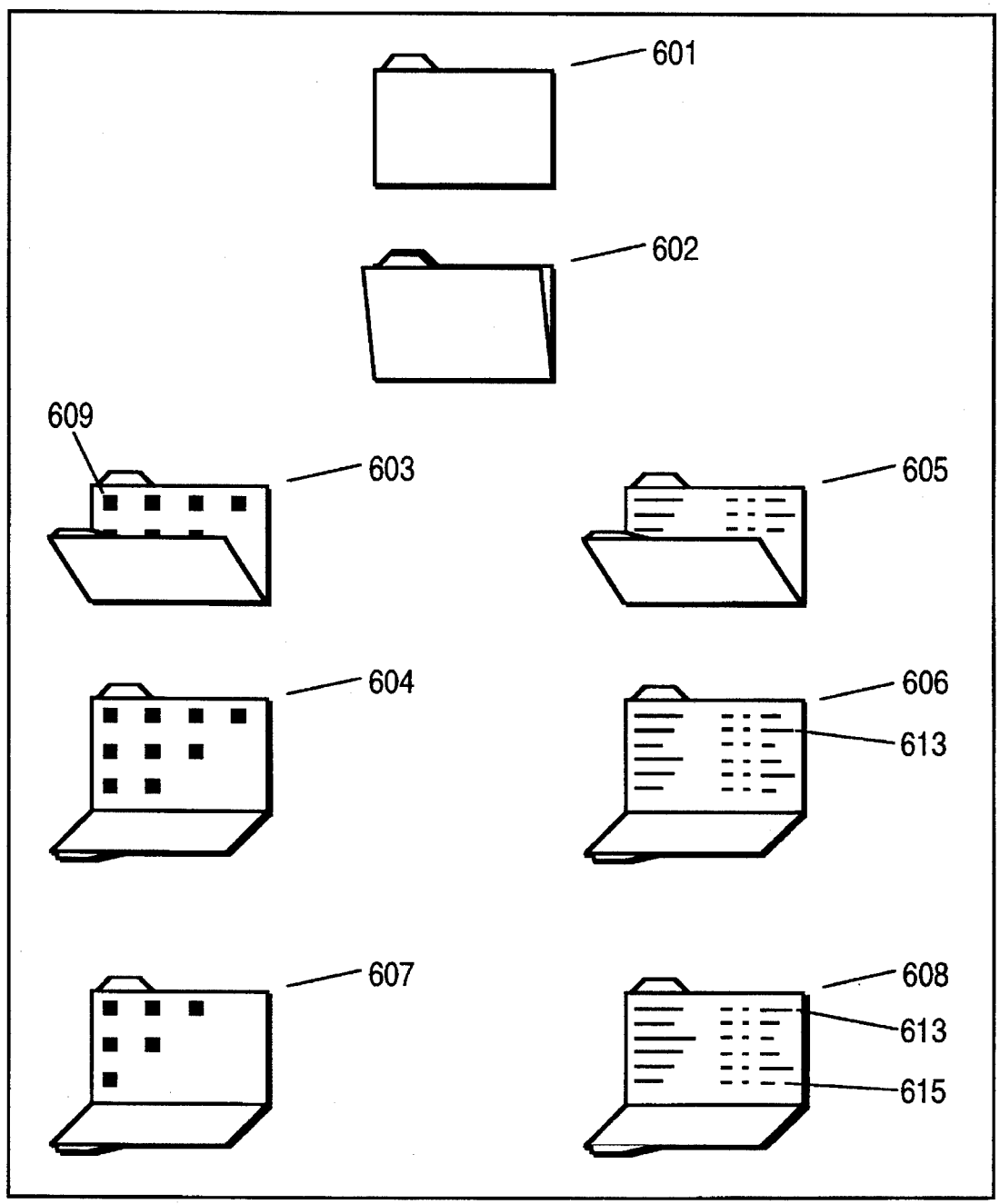
FIG. 6 is an illustration of an animated folder and the dynamically created icon frames in two animation scenarios for a folder.

Icons representing folder contents may also be depicted in an animated manner. FIG. 6 depicts two equivalent content animation scenarios for an icon representing a folder. Both icon frame sequences depict a folder opening up and displaying part of its content as each frame of the sequence is sequentially displayed. The user is thus able to understand that the icon depiction represents a folder that can be opened to access the objects contained therein and that the content of the folder is displayed and arranged in the depicted manner.

The first content animation scenario contains five static icon depictions (frames) 601, 602, 603, 604 and 607. The second example contains frames 601 and 602, as well as frames 605, 606 and 608. In either example, the content animation scenario is played out in a similar manner, as previously described for animated icon depictions representing text documents or graphic documents in FIGS. 4 and 5 respectively. Each scenario is played out by displaying each frame of the scenario sequentially for a short period of time (typically, one-half second).

In the first example, the folder contents are depicted as a group of icon depictions representing the actual file contents of the folder in an icon format. The second equivalent example depicts the contents of the folder in textual format. The first two frames, 601 and 602, of either example require no special processing since these frames can be displayed in the same manner for all folders. These two frames are not content based. The third, fourth and fifth frames (603, 604 and 607 for the first example and 605, 606 and 608 for the second example), however, are displayed dependent on the content of the folder being represented by the animated folder icon depiction.

In order to generate the content-based animation frames, additional processing is required by the present invention. This processing logic must first determine if the folder is currently set up to be viewed in an icon format or a textual format. This determination is made by accessing folder data contained within the folder. Folder data contains the display mode previously set up by the user employing a well known technique in the computer art. If the folder is set up in an icon display format, the folder is scanned to determine the existence and location of each of the icons contained within the folder. For each icon contained in the folder, a colored square or other appropriate symbol 609 (icon symbol) is placed at the corresponding location in the animated icon frame, such as is shown by frames 603, 604 and 607. If all of the icons contained within the folder can be displayed as icon symbols in the icon frames 603 and 604, then no additional icon flames need be displayed. If the number of icons contained within the folder exceed the number that can be displayed within a single icon frame, additional frames are required. Thus, as shown in FIG. 6, one or more additional frames 607 would be utilized, showing rows of icons in different positions, to give the animated icon depiction the appearance of sequentially scrolling through contents of the folder.

The second example shown in FIG. 6 is essentially the same as the first example except that the contents of the folder is displayed in a textual, rather than an iconic, format. For instance, in frame 608, the line 613, representing textual data associated with one file in the folder, has been moved up one position in relation to its previous position 613, as shown in frame 606. Similarly, all subsequent lines following line 613 have been moved up one position. An additional line 615 has been added at the bottom of the icon frame 608. In this way, additional frames can be added to the animation scenario to portray the contents of the folder as it would be viewed if scrolled up the folder.

The present invention employs icon depiction animation to represent the actual contents of a particular object (i.e., document, file or folder). Content animation allows a user to distinguish between different objects of the same type. This technique can be used with icons representing text documents, graphical documents or folders. A method for implementing content animation in a preferred embodiment is described in the following section.

Animated icon depictions representing the content of text or word processing documents can be generated and displayed using the means and methods of the present invention. As described earlier, the technique involves the creation of a set of icon frames that are sequentially displayed during the animation scenario. For content animation, however, the image in each frame must be dynamically generated based on the content of the corresponding portion of the actual object represented by the icon depiction. For example, in a text document, each frame of the content animation scenario may correspond to a different page from the actual text document represented by the icon depiction. Such an implementation is illustrated in FIG. 7.

Referring to FIG. 7, two sample pages of text 701 and 703 from a text document are illustrated. Using the methods of the present invention, an icon frame corresponding to each page of text can be created. The icon frame is created by producing a representation, such as a bit-map, of the page of text in order to produce a scaled-down replica of the page. Referring again to FIG. 7, a page 701 of text is shown. First, the representation of the page is logically divided into a number of equally sized segments in both the horizontal and vertical direction. This logical division operates to partition the page into a number of equally sized page cells. For example, page 701 could be divided into a 24×30 array of page cells. Next, each page cell is analyzed to determine if the cell is predominantly of one color or another in order to determine the color value to assign to each pixel of the array, or bit of the bit-map, corresponding to the replica of the object (assuming of course that each pixel is only capable of having a single color, which may not always be the case). This determination can be made in a number of manners.

One manner is to measure the percentage presence of different colors (either black and white, gray-scale or color) within a cell, and to assign the pixel or bit of the replica of the object a color value corresponding to the predominant color within the cell. Another manner, which would not be particularly suited to small icon depictions or large icon depictions separated into large segments, but which may be particularly applicable to monochrome displays, is to simply determine whether or not any characters or portions of characters are present within the cell. If characters are present, the corresponding bit in the bitmap for the frame is set to a one, indicating a dark pixel. If no characters are present in the cell, the corresponding bit is set to a zero, producing a white pixel. In this manner, each cell of the representation of the page can be scanned and the corresponding icon frame 702 can be produced as illustrated in FIG. 7. The page example 703, also shown in FIG. 7 with the corresponding icon frame 704, illustrates another example of the process of translating a page of text into an icon frame. Once the set of icon frames are generated, the animation scenario can be initiated as described above.

Figure 8:
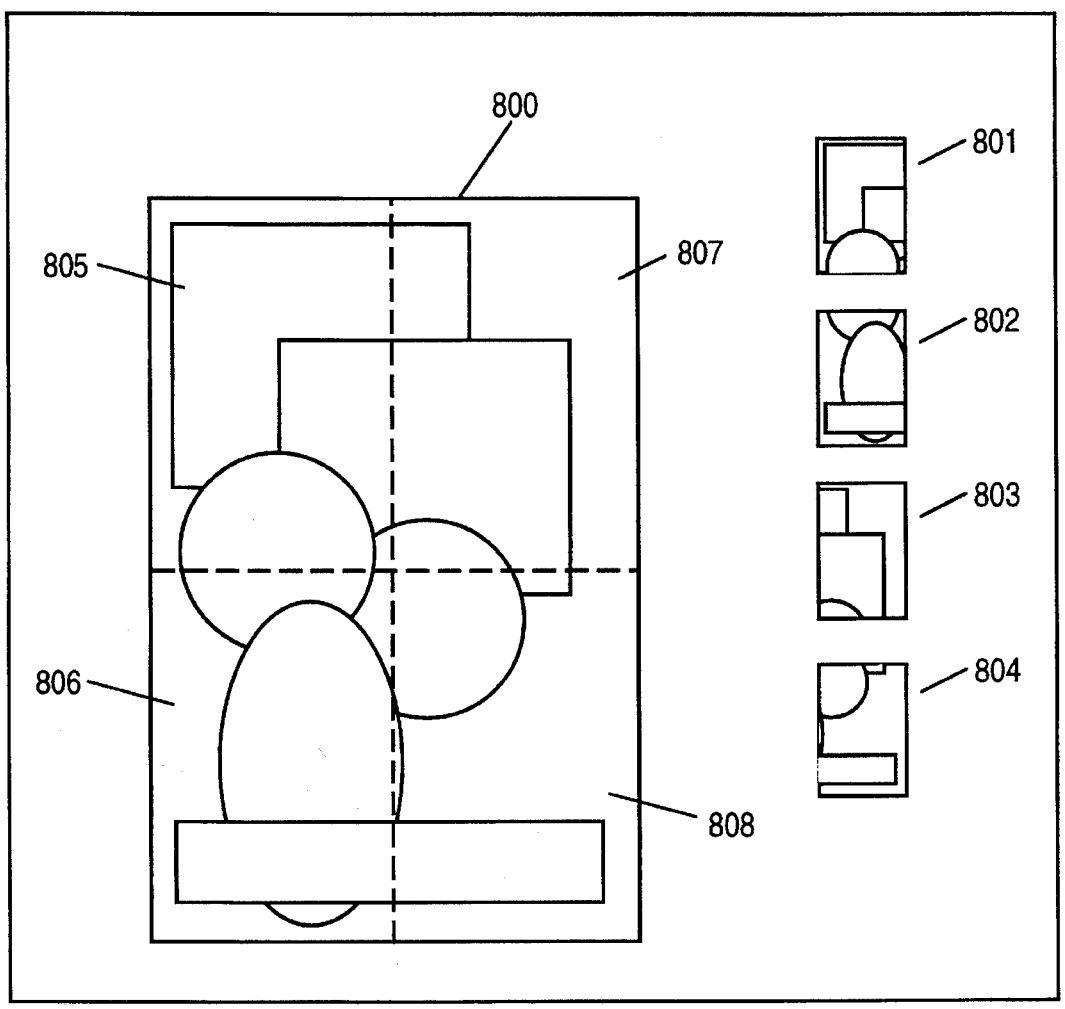
FIG. 8 is an illustration of a graphic document and the corresponding dynamically created icon frames.

Content animation can also be used to represent a graphical or non-paginated document. FIG. 8 illustrates an example of a graphic document 800. In FIG. 8, a graphic document 800, represented by a content animated icon depiction, is first logically divided into four segments (quadrants), an upper left 805, lower left 806, upper right 807, and lower right 808 quadrant. Each quadrant 805–808 corresponds to a single icon flame, 801–804 respectively. Each quadrant 805–808 is processed to produce a corresponding icon frame 801–804 in a manner similar to the process used to produce icon frames for text documents. First, a quadrant is divided into an array of cells. Each cell corresponds to a bit in an icon frame. Next, each cell is analyzed to determine if the cell is predominantly light or dark. This determination is made based on whether any images from the document intersect the cell, or whether the color of the cell is above a known field threshold. If either of these conditions is true, the corresponding bit in the icon frame is set to a one, thereby producing a dark pixel. If both conditions are false, the corresponding pixel is set to a zero, or light pixel. In this manner, the icon flames 801–804 can be produced as shown in FIG. 8. Once the icon frames are generated, the animation scenario can be initiated.

The animation scenario in FIG. 8 is initiated when the animated icon depiction is activated, as described above. When this occurs, each of the icon frames 801–804 are displayed sequentially in the same location. Each frame of the animation scenario is displayed on the display screen for a short period of time (typically, one half second). As each frame is sequentially displayed, the animated icon depiction has the appearance of scanning the graphical document represented by the icon from the upper left corner down to the lower right corner. This animation sequence conveys to the user the content of the specific document being represented by the animated icon depiction.

Other alternative embodiments of the present invention are conceivable. For example, the graphical document being represented by the animation scenario in FIG. 8 could be divided into a greater or lesser number of sections. In the example of FIG. 8, the graphical document was divided into four sections, but a greater or lesser number of sections could equivalently be used.

The process of generating the frames required for the content animation scenario should be performed whenever the file or folder represented by the content animated icon is modified. This is required for the appearance of an icon depiction to continue to correspond to the content of the object it represents. For example, when an object is modified, the associated content icon depiction could be regenerated on a periodic basis before the modifications are saved, or when the user finishes the modification and saves the object. The occurrence of some other arbitrary event could also be used to trigger generation of the icon depictions. For example, entering a command named "show content" could be used to trigger the icon depiction or animated icon depiction of one or more icon images. These predetermined events and others can be used to trigger either the generation or regeneration cycle.

Although this invention has been shown in relation to particular embodiments, it should not be considered so limited. Rather it is limited only by the appended claims.

We claim:

1. A process for generating a reduced visual version of an object based on the content of the object and displaying the reduced visual version on a display screen of a computer, the reduced visual version being associated with the object, the computer having memory for storing and displaying the object, the reduced visual version having functionality of an icon, the object having a variable visual format based upon information contained by the object, comprising the steps of:
   generating the reduced visual version of the object based on the content of the object by transforming at least a portion of the variable visual format of the object; and,
   displaying the reduced visual version of the object on the display screen.

2. A process for generating and displaying a reduced visual version as recited in claim 1, wherein said generating step includes the steps of:
   producing a representation of the portion; and
   generating the reduced visual version of the portion from the representation.

3. A process for generating and displaying a reduced visual version as recited in claim 1, wherein said step of generating the reduced visual version is performed on an occurrence of a predetermined event.

4. A process for generating and displaying a reduced visual version as recited in claim 3, wherein said predetermined event includes a selection of the reduced visual version by means for selecting.

5. A process for generating and displaying a reduced visual version as recited in claim 1, and further comprising the step of moving the reduced visual version to any desired location on the display screen using means for selecting.

6. A process for generating a reduced visual version of an object based on the content of the object and displaying the reduced visual version on a display screen of a computer, the reduced visual version being associated with the object, the computer having memory for storing and displaying the object, the reduced visual version having functionality of an icon, the object having a variable visual format based upon information contained by the object, comprising the steps of:
   generating the reduced visual version of the object based on the content of the object by transforming at least a portion of the variable visual format of the object; and,
   displaying the reduced visual version of the object on the display screen, wherein said generating step includes the steps of:
   producing a representation of the portion; and
   generating the reduced visual version of the portion from the representation, wherein the reduced visual version is comprised of a plurality of display elements, and wherein said step of generating the reduced visual version includes the steps of:
   partitioning the representation into a plurality of segments; and
   translating the segments into the display elements of the reduced visual version, whereby a relative position of each segment within the representation corresponds to a relative position of a display element within the reduced visual version.

7. A process for generating and displaying a reduced visual version as recited in claim 6, wherein said step of translating the segments includes the steps of:
   determining a color ratio for each segment of the representation by measuring a percentage of different colors present within each segment; and
   assigning a color value to each display element of the reduced visual version based upon the color ratio of a corresponding segment of the representation.

8. A process for generating and displaying a reduced visual version as recited in claim 6, wherein the display elements are pixels, wherein the representation is comprised of a plurality of bits forming a bit-map, and wherein said step of translating the segments includes the steps of:
   determining a color ratio for each segment of the representation by measuring a percentage of differently colored bits present within each segment; and
   assigning a color value to each pixel of the reduced visual version based upon the color ratio of a corresponding segment of the representation.

9. A process for generating a reduced visual version of an object based on the content of the object and displaying the reduced visual version on a display screen of a computer, the reduced visual version being associated with the object, the computer having memory for storing and displaying the object, the reduced visual version having functionality of an icon, the object having a variable visual format based upon information contained by the object, comprising the steps of:
   generating the reduced visual version of the object based on the content of the object by transforming at least a portion of the variable visual format of the object; and,
   displaying the reduced visual version of the object on the display screen, wherein said step of generating the reduced visual version is performed on an occurrence of a predetermined event, wherein said predetermined event is selected from the group consisting of an expiration of a preset time period and a modification and storage of the variable visual format of the object associated with the reduced visual version.

10. A process for generating and displaying an animated reduced visual version of an object based on the content of the object and displaying the animated reduced visual version in a location on a display screen of a computer, the reduced visual version being associated with the object, the computer having memory for storing and displaying the object, the reduced visual version having functionality of an icon, the object having a variable visual format based upon information contained by the object, comprising the steps of:
   generating a plurality of static reduced visual versions of the object based on the content of the object, each reduced visual version being generated by transforming a section of at least a portion of the variable visual format of the object; and,
   displaying the static reduced visual versions in a serial sequence at said location on the display screen.

11. A process for generating and displaying an animated reduced visual version as recited in claim 10, wherein said generating step includes the steps of:
   producing a representation of the portion; and
   generating the static reduced visual versions from the representation.

12. A process for generating and displaying an an animated reduced visual version as recited in claim 10, wherein said step of generating the static reduced visual versions of the object is performed upon an occurrence of a predetermined event.

13. A process for generating and displaying an animated reduced visual version as recited in claim 12, wherein said predetermined event includes a selection of the reduced visual version by selection means.

14. A process for generating and displaying an animated reduced visual version as recited in claim 10, and further comprising the step of moving the animated reduced visual version to any desired location on the display screen using means for selecting.

15. A process for generating an animated reduced visual version of an object based on the content of the object and displaying the animated reduced visual version in a location on a display screen of a computer, the reduced visual version being associated with the object, the computer having memory for storing and displaying the object, the reduced visual version having functionality of an icon, the object having a variable visual format based upon information contained by the object, comprising the steps of:

generating a plurality of static reduced visual versions of the object based on the content of the object, each reduced visual version being generated by transforming a section of at least a portion of the variable visual format of the object; and displaying the static reduced visual versions in a serial sequence at said location on the display screen, wherein said generating step includes the steps of;

producing a representation of the portion: and generating the static reduced visual versions from the representation, wherein the static reduced visual versions are comprised of a plurality of display elements, and wherein said step of generating the static reduced visual versions includes the steps of:

partitioning the representation into a plurality of segments; and transforming the segments into display elements of the static reduced visual versions, whereby a relative position of each segment within the representation corresponds to a relative position of a display element within a static reduced visual version.

16. A process for generating and displaying an animated reduced visual version as recited in claim 15, wherein said step of transforming the segments includes the steps of:

determining a color ratio for each segment of the representation by measuring a percentage of different colors present within each segment; and assigning a color value to each display element of the static reduced visual versions based upon the color ratio of a corresponding segment of the representation.

17. A process for generating and displaying animated reduced visual version as recited in claim 15, wherein the display elements are pixels, wherein the representation is comprised of a plurality of bits forming a bit-map, and wherein said step of transforming the segments includes the steps of:

determining a color ratio for each segment of the representation by measuring a percentage of differently colored bits present within each segment; and assigning a color value to each pixel of each static reduced visual version based upon the color ratio of a corresponding segment of the representation.

18. A process for generating an animated reduced visual version of an object based on the content of the object and displaying the animated reduced visual version in a location on a display screen of a computer, the reduced visual version being associated with the object, the computer having memory for storing and displaying the object, the reduced visual version having functionality of an icon, the object having a variable visual format based upon information contained by the object, comprising the steps of;

generating a plurality of static reduced visual versions of the object based on the content of the object, each reduced visual version being generated by transforming a section of at least a portion of the variable visual format of the object; and, displaying the static reduced visual versions in a serial sequence at said location on the display screen, wherein said step of generating the static reduced visual versions of the object is performed upon an occurrence of a predetermined event, wherein said predetermined event is selected from the group consisting of an expiration of a preset time period and a modification and storage of the variable visual format of the object associated with the reduced visual version.

19. A process for generating a reduced visual version of an object based on the content of the object and displaying the reduced visual version on a display screen of a computer, the reduced visual version being associated with the object, the computer having memory for storing and displaying the object, the reduced visual version having functionality of an icon, the object having a variable visual format based upon information contained by the object, comprising the steps of;

generating the reduced visual version of the object based on the content of the object by transforming at least a portion of the variable visual format of the object;

displaying the reduced visual version of the object on the display screen; and, providing means for selecting which of the reduced visual version and the icon is to be displayed, wherein the step of displaying the reduced visual version of the object on the display screen is performed in response to selection signals from the means for selecting.

20. A process for generating an animated reduced visual version of an object based on the content of the object and displaying the animated reduced visual version in a location on a display screen of a computer, the reduced visual version being associated with the object, the computer having memory for storing and displaying the object, the reduced visual version having functionality of an icon, the object having a variable visual format based upon information contained by the object, comprising the steps of;

generating a plurality of static reduced visual versions of the object based on the content of the object, each reduced visual version being generated by transforming a section of at least a portion of the variable visual format of the object;

displaying the static reduced visual versions in a serial sequence at said location on the display screen: and, providing means for selecting which of the reduced visual version and the icon is to be displayed, wherein the step of displaying the reduced visual version of the object on the display screen is performed in response to selection signals from the means for selecting.

21. A reduced visual version of an object based on the content of the object for display at a location on a display screen of a computer, the reduced visual version being associated with the object, the computer having memory for storing and displaying the object, the reduced visual version having functionality of an icon, the object having a variable visual format based upon information contained by the object, comprising:

means for generating at least one reduced visual version of the object based on the content of the object by transforming at least a portion of the variable visual format of the object; and means for displaying the reduced visual versions of the object at the location on the display screen.

22. A reduced visual version as recited in claim 21, wherein said means for generating at least one reduced visual version comprises:

means for producing a representation of the portion; and means for generating the reduced visual versions of the portion from the representation.

23. A reduced visual version as recited in claim 22, wherein the representation is a visual image of the variable format of the object, and wherein the reduced visual versions are scaled-down visual images resembling the variable format of the object.

24. A reduced visual version as recited in claim 21, wherein said reduced visual version is generated upon an occurrence of a predetermined event.

25. A reduced visual version as recited in claim 24, wherein said predetermined event includes a selection of the reduced visual version by means for selecting.

26. A reduced visual version of an object based on the content of the object for display at a location on a display screen of a computer, the reduced visual version being associated with the object, the computer having memory for storing and displaying the object, the reduced visual version having functionality of an icon, the object having a variable visual format based upon information contained by the object, comprising:

means for generating at least one reduced visual version of the object based on the content of the object by transforming at least a portion of the variable visual format of the object; and means for displaying the reduced visual versions of the object at the location on the display screen, wherein said means for generating at least one reduced visual version comprises:

means for producing a representation of the portion; and means for generating the reduced visual versions of the portion from the representation, wherein each reduced visual version is comprised of a plurality of display elements, and wherein said means for generating the reduced visual versions comprises:

means for partitioning the representation into a plurality of segments; and means for transforming the segments into the display elements of the reduced visual versions, whereby a relative position of each segment within the representation corresponds to a relative position of a display element within a reduced visual version.

27. A reduced visual version as recited in claim 26, wherein said means for transforming the segments comprises:

means for determining a color ratio for each segment of the representation by measuring a percentage of different colors present within each segment; and means for assigning a color value to each display element of the reduced visual versions based upon the color ratio of a corresponding segment of the representation.

28. A reduced visual version as recited in claim 26, wherein the display elements are pixels, wherein the representation is comprised of a plurality of bits forming a bit-map, and wherein said means for transforming the segments comprises:

means for determining a color ratio for each different color within each segment of the representation by comparing a measured number of bits of each color within each segment to a measured number of total bits of colors within each segment; and means for assigning a single color value to each pixel of each reduced visual version according to the color ratios determined for a corresponding segment of the representation.

29. A reduced visual version as recited in claim 26, and further comprising means for moving the reduced visual version to any desired location on the screen using selection means.

30. A reduced visual version of an object based on the content of the object for display at a location on a display screen of a computer, the reduced visual version being associated with the object, the computer having memory for storing and displaying the object, the reduced visual version having functionality of an icon, the object having a variable visual format based upon information contained by the object, comprising:

means for generating at least one reduced visual version of the object based on the content of the object by transforming at least a portion of the variable visual format of the object; and means for displaying the reduced visual versions of the object at the location on the display screen, wherein said reduced visual version is generated upon an occurrence of a predetermined event, wherein said predetermined event is selected from the group consisting of an expiration of a preset time period and a modification and storage of the variable visual format of the object associated with the reduced visual version.

31. A reduced visual version of an object based on the content of the object for display at a location on a display screen of a computer, the reduced visual version being associated with the object, the computer having memory for storing and displaying the object, the reduced visual version having functionality of an icon, the object having a variable visual format based upon information contained by the object, comprising:

means for generating at least one reduced visual version of the object based on the content of the object by transforming at least a portion of the variable visual format of the object; and means for displaying the reduced visual versions of the object at the location on the display screen, wherein said means for generating at least one reduced visual version comprises:

means for producing a representation of the portion; and means for generating the reduced visual versions of the portion from the representation, wherein the representation is comprised of a plurality of different sections, wherein the reduced visual versions are comprised of a plurality of images of the different sections, and wherein said means for displaying the reduced visual versions includes means for displaying the reduced visual versions in a serial sequence in response to selection signals.

32. A reduced visual version of an object based on the content of the object for display at a location on a display screen of a computer, the reduced visual version being associated with the object, the computer having memory for storing and displaying the object, the reduced visual version having functionality of icon, the object having a variable visual format based upon information contained by the object, comprising:

means for generating at least one reduced visual version of the object based on the content of the object by transforming at least a portion of the variable visual format of the object; and means for displaying the reduced visual versions of the object at the location on the display screen, wherein said means for generating at least one reduced visual version comprises:

means for producing a representation of the portion; and means for generating the reduced visual versions of the portion from the representation, wherein the representation is a visual image of the variable format of the object, and wherein the reduced visual versions are scaled-down visual images resembling the variable format of the object, wherein said reduced visual versions are generated upon an occurrence of a predetermined event.

33. A reduced visual version as recited in claim 32, wherein said predetermined event includes an expiration of a preset time period.

34. A reduced visual version as recited in claim 32, wherein said predetermined event includes a selection of the reduced visual version by means for selecting.

35. A reduced visual version as recited in claim 32, wherein said predetermined event includes a modification and storage of the variable format of the object associated with the reduced visual version.

36. A reduced visual version of an object based on the content of the object for display at a location on a display screen of a computer, the reduced visual version being associated with the object, the computer having memory for storing and displaying the object, the reduced visual version having functionality of an icon, the object having a variable visual format based upon information contained by the object, comprising;

means for generating at least one reduced visual version of the object based on the content of the object by transforming at least a portion of the variable visual format of the object; and means for displaying the reduced visual versions of the object at the location on the display screen, wherein said means for generating at least one reduced visual version comprises:

means for producing a representation of the portion: and means for generating the reduced visual versions of the portion from the representation, wherein the representation is a visual image of the variable format of the object, and wherein the reduced visual versions are scaled-down visual images resembling the variable format of the object, and further comprising means for moving the reduced visual version to any desired location on the display screen using means for selecting.

37. A reduced visual version of an object based on the content of the object for display at a location on a display screen of a computer, the reduced visual version being associated with the object, the computer having memory for storing and displaying the object, the reduced visual version having functionality of an icon, the object having a variable visual format based upon information contained by the object, comprising;

means for generating at least one reduced visual version of the object based on the content of the object by transforming at least a portion of the variable visual format of the object;

means for displaying the reduced visual versions of the object at the location on the display screen; and, means for selecting which of the reduced visual version and the icon are to be displayed on the display screen, wherein the means for displaying the reduced visual version displays the reduced visual version in response to selection signals from the means for selecting.

38. A reduced visual version of an object based on the content of the object for display at a location on a display screen of a computer, the reduced visual version being associated with the object, the computer having memory for storing and displaying the object, the reduced visual version having functionality of an icon, the object having a variable visual format based upon information contained by the object, comprising:

means for generating at least one reduced visual version of the object based on the content of the object by transforming at least a portion of the variable visual format of the object;

means for displaying the reduced visual versions of the object at the location on the display screen; and, means for displaying a plurality of said reduced visual versions in a serial sequence at the location on the display screen.

39. The reduced visual version as recited in claim 38 wherein plurality of reduced visual versions are generated by transforming a plurality of different portions of the variable visual format of the object.

* * * * *